(12) United States Patent
Meti et al.

(10) Patent No.: US 12,609,911 B2
(45) Date of Patent: Apr. 21, 2026

(54) INCLUDING PACKET PROCESSING DATA FOR DEEP PACKET INSPECTION CLASSIFICATION RULES IN A COMBINED LOOKUP TABLE USED FOR PACKET CLASSIFICATION AT A NETWORK DEVICE

(71) Applicant: Arista Networks, Inc., Santa Clara, CA (US)

(72) Inventors: Ashok Meti, Bengaluru (IN); Milton Yumin Xu, San Jose, CA (US); Ethan Robert Vadai, San Jose, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 84 days.

(21) Appl. No.: 18/394,745

(22) Filed: Dec. 22, 2023

(65) Prior Publication Data

US 2025/0211574 A1 Jun. 26, 2025

(51) Int. Cl.
| | |
|---|---|
| *H04L 9/08* | (2006.01) |
| *H04L 9/40* | (2022.01) |
| *H04L 45/74* | (2022.01) |
| *H04L 69/22* | (2022.01) |

(52) U.S. Cl.
CPC .......... *H04L 63/0263* (2013.01); *H04L 45/74* (2013.01); *H04L 63/0236* (2013.01); *H04L 69/22* (2013.01)

(58) Field of Classification Search
CPC . H04L 69/22; H04L 47/2441; H04L 63/0263; H04L 45/74; H04L 63/0236
See application file for complete search history.

(56) References Cited

U.S. PATENT DOCUMENTS

| | | | | |
|---|---|---|---|---|
| 2008/0077705 | A1* | 3/2008 | Li | H04L 47/32 |
| | | | | 709/236 |
| 2016/0283859 | A1* | 9/2016 | Fenoglio | H04L 43/04 |
| 2016/0330111 | A1* | 11/2016 | Manghirmalani | H04L 45/38 |
| 2019/0215307 | A1* | 7/2019 | Gopal | G06F 9/45558 |

* cited by examiner

*Primary Examiner* — Hee Soo Kim
(74) *Attorney, Agent, or Firm* — Sprinkle IP Law Group

(57) ABSTRACT

Systems and methods for determining whether to perform deep packet inspection (DPI) on packets received at a network device based on shallow packet inspection data are disclosed. Embodiments may include DPI classification data in a combined lookup table that is utilized for shallow packet data based packet classification at a network device. Using the results of lookups in such a combined look table based on received packets, determinations can be made whether to perform DPI on such received packets, and those packets forwarded accordingly.

20 Claims, 5 Drawing Sheets

INCLUDING PACKET PROCESSING DATA FOR DEEP PACKET INSPECTION CLASSIFICATION RULES IN A COMBINED LOOKUP TABLE USED FOR PACKET CLASSIFICATION AT A NETWORK DEVICE

BACKGROUND

Network devices generate, send, receive, forward or otherwise manipulate or process data using packets. A packet is a data structure that includes one or more portions that include data (e.g., a payload) and one or more portions (e.g., headers including control data) that include information that may be used to determine sending or processing aspects of the packet (e.g., where or how to send the packet).

As network devices may process different packets differently, when a network device receives a packet, it may need to ascertain how to process the packet. To enable such differential processing of packets, network devices perform packet classification (e.g., filtering) for a number of tasks such as, for example, the application of policy rules (e.g., security policies, traffic management policies, etc.) to packets received at the network device. Certain packet classification techniques may classify a packet using data on a packet that may be obtained based on the headers of the packet. This type of packet classification may utilize data that can be obtained from a shallow, or stateful, packet inspection such as a source address, destination address, port number, or other packet data that may be obtained from a header of the packet, to classify the packet.

Other types of packet classification may, however, be performed using a methodology referred to as deep packet inspection (DPI). Using DPI both the packet headers and the data included in the packet itself (e.g., the payload) may be inspected and used to classify that packet. However, to even determine whether a packet should have DPI packet classification rules applied it may be necessary to perform a DPI classification rule lookup, which may itself entail the performance of some amount of DPI on the packet. The implementation of DPI based rule classification of packets may thus detrimentally affect the performance of a network device.

It would thus be desirable to have network devices avoid performing DPI on packets in instances where DPI on the packet may be altogether unnecessary. In particular, it would be desirable to enable network devices to determine which packets may require DPI and process packets according to that determination.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Figure 1:
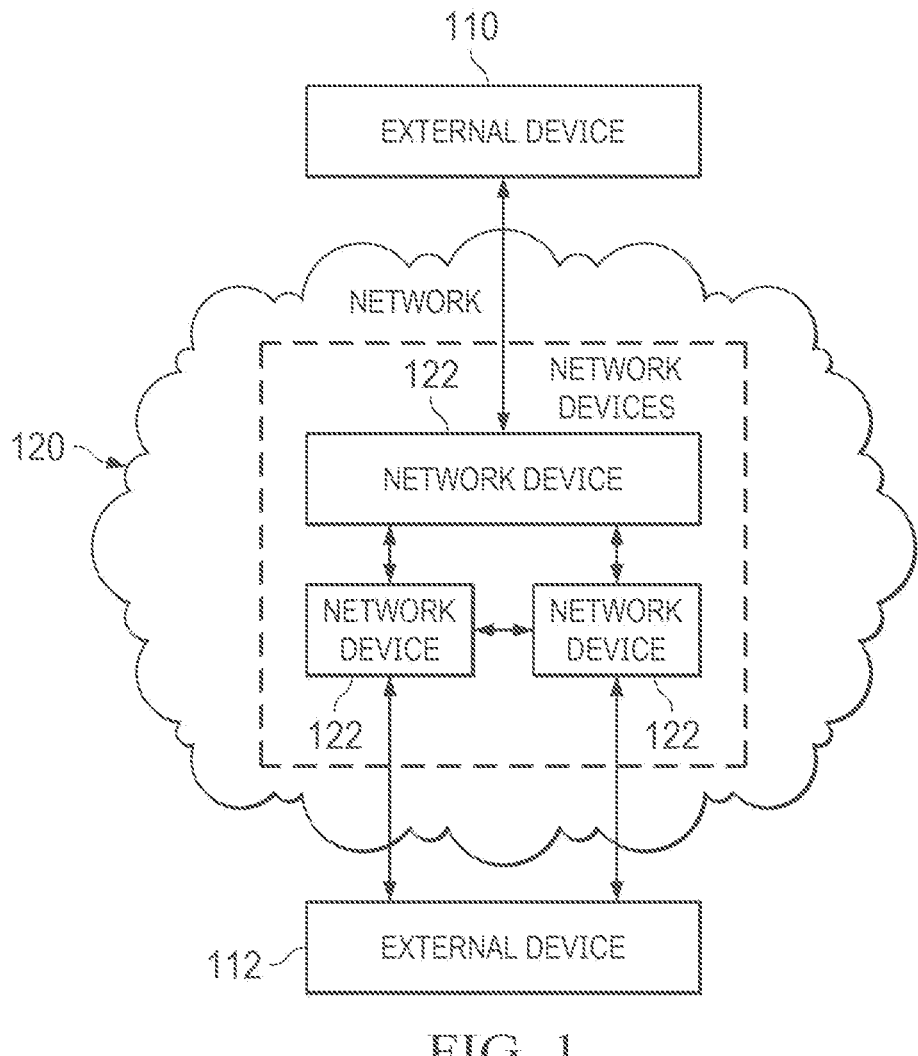
FIG. 1 is a block diagram of a network system including an embodiment of a network device for including and utilizing DPI classification data in a combined lookup table.

Network devices (e.g., switches, routers, firewalls, etc.) perform packet classification (e.g., filtering) for a number of tasks such as, for example, the application of policy rules to packets received at the network device. Certain packet classification techniques may classify a packet using data on a packet that may be obtained based on the headers of the packet. This type of packet classification may utilize data that can be obtained from a shallow, or stateful, packet inspection such as a source address, destination address, port number, or other packet data that may be obtained from a header of the packet, to classify the packet.

Other types of packet classification may, however, be performed using a methodology referred to as deep packet inspection (DPI). Using DPI both the packet headers and the data included in the packet itself may be inspected and used to classify that packet. DPI based packet classification rules are thus often used for implementing security measures in network devices (e.g. firewalls) such as OSI Layer 7 (L7) (e.g., application) based security rules, but may also be utilized for packet classification rules pertaining to baselining application behavior, analyzing network usage, troubleshooting network performance, ensuring that data is formatted correctly, or other purposes.

The use of DPI to classify packets is, however, not without its issues. To illustrate, it is typically the case that to determine whether a packet should have DPI packet classification rules applied it may be necessary to perform a distinct or separate DPI classification rule lookup for packets at a network device. In a somewhat worst case scenario, then, the determination of whether any DPI classification rules apply to a packet may itself require at least some DPI of that packet to obtain data that may be used to match a DPI packet classification rule. DPI is computationally expensive. The necessity of a separate lookup to determine the applicability of DPI classification rules to a packet, and the complexity of determining DPI data from a packet for that lookup, may thus entail the use of additional computing resources, including additional hardware or memory structures devoted to containing these additional lookup tables or additional computing cycles and associated time or other overhead required to perform DPI and make these lookups. Moreover, these problems are exacerbated by the fact that such a lookup may need to be performed for practically every packet that arrives at the network device. Specifically, if such a DPI classification rule lookup is not performed, it may be the case that no determination can even be made if a DPI classification rule applies to that packet.

In the context of a real time network environment these requirements are, needless to say, problematic. Namely, the additional overhead required for the DPI based rule classification of packets (including the additional lookups and DPI required) may severely degrade or impact the performance of network devices engaged in DPI based rule classification. As but one example, for network security devices like firewalls or the like where a large number of classification rules may be implemented for security purposes, packet processing time is critical.

It would thus be desirable to differentiate packets requiring DPI (e.g., for DPI based rules classification) from other packets received at a network device such that DPI of those other packets may be avoided. In particular, it would be desirable to have a mechanism to determine which packets actually require DPI (e.g., by determining if any DPI packet classification rules apply to the packet), and process packets according to that determination. Specifically, what is desired are simple and straightforward systems and methods for determining whether any DPI based classification rules may apply to a packet using a lookup based on shallow packet inspection data such that a combined lookup using shallow packet inspection data may be utilized to determine both classification data for classification rules associated with shallow inspection data while also obtaining DPI classification data associated with DPI based classification rules from that same lookup.

To those ends, among others, attention is now directed to systems and methods for including DPI classification data in a combined lookup table that is utilized for shallow packet data based packet classification at a network device. This DPI classification data may indicate whether any DPI based classification rules may apply to the packet. These DPI based classification rules may be L7 based security rules (and the term L7 rules may be used to refer to DPI based packet classification rules herein without loss of generality). Accordingly, when a lookup is performed in this combined lookup table in association with classification of a received packet using shallow packet data such as the source address or destination address of that packet (or other shallow packet data such as a (e.g., L4) source or destination port, etc.), this DPI classification data (e.g., indicating whether any DPI based classification rule may apply to the packet) can be obtained from that lookup (e.g., in addition to any other classification data returned from the lookup).

If DPI classification data is returned for the packet indicating a DPI based classification rule (e.g., an L7 rule) may apply to the packet, the packet can be provided to a deep packet inspector adapted to perform DPI on the packet to determine additional DPI classification data for the packet. The classification data for the packet (e.g., including any additional DPI classification data for the packet) can then be used to determine any (e.g., DPI) classification rules applicable to the packet, such as any applicable L7 based security rules, and the packet forwarded according to any applicable (e.g., DPI) classification rules. In this manner, if DPI classification data returned from a lookup in the combined lookup table indicates a DPI based classification rule may apply (e.g., a L7 label is returned in response to the lookup), that packet may be provided for DPI, and additional DPI classification data obtained through this DPI may be used to match any applicable DPI based classification rules at the network device. The packet can then be forwarded accordingly.

Alternatively, if the DPI classification data returned from the lookup in the combined lookup table indicates that no DPI based classification rules apply to the packet (e.g., no L7 label is returned in response to the lookup, or no other DPI classification data is returned), the packet may be forwarded without performing DPI on the packet. For example, in certain embodiments, when the DPI classification data returned from the lookup indicates no DPI based classification rule applies (e.g., no DPI classification data is returned), a match may be performed on other types of classification rules (e.g., OSI Layer 4 (L4) classification rules) based on the classification data for the packet returned from the (e.g., same) combined lookup. The packet can then be forwarded based on the results of this (e.g., L4) classification rule matching.

In certain embodiments, the combined lookup table used for looking up classification data (e.g. including DPI classification data) may be a lookup table adapted to return labels matching a key formed from shallow packet inspection data obtained from the packet. The classification data returned in response to a lookup in the combined lookup table may therefore be a set of labels (or values for a set of labels may be determined from the result of the lookup). Accordingly, in some embodiments DPI classification data may itself be a DPI label (referred to also as an L7 label without loss of generality) associated with a key in the combined lookup table such that when a lookup is performed using a key formed from shallow packet inspection data obtained from a packet (e.g., a source or destination address) this DPI label may be returned (e.g., if that key is associated with a DPI label) along with any other labels associated with the key.

In particular, to reduce the overhead and increase the speed of packet classification, certain techniques have been developed to utilize lookup tables to assign labels (e.g., that may be used to determine if classification rules apply to the packet) to a packet based on packet data that may be obtained from shallow packet inspection such as a source or destination address, or a port identifier, or other classification matching parameters or qualifiers of the packet being processed. These labels can then be used for determining whether those classification rules apply to the packet. Such techniques are described in U.S. Pat. No. 11,552,887 to Holbrook et al., issued on Jan. 10, 2023, and hereby incorporated by reference in its entirety for all purposes. Such a lookup table may be a lookup table including one or more prefixes (e.g., address or prefixes) that operate according to a longest prefix match (LPM) method of operation. In one specific instance, for example, the lookup table may be a LPM trie where nodes of the trie comprise an address or prefix.

Thus, a combined lookup table according to embodiments may be implemented as a combined LPM lookup table adapted to return labels in response to a lookup based on an address or prefix. In these embodiments a network device may be adapted to allow a user to associate addresses or prefixes with a DPI label (e.g., an L7 label) indicating that the address or prefix (or a less specific prefix) is associated with a DPI based classification rule (e.g., an L7 based security policy rule). In other words, a DPI label can indicate that a DPI based classification rule or policy may (or may not) apply to that packet or that DPI should otherwise be performed on the packet. The DPI label can, for example, be a policy type label indicating a type of policy that may (or may not) apply, such a policy label indicating that an L7 policy (e.g., one or more rules) may apply or that an L4 policy may apply. This DPI label can then be associated with those addresses or prefixes in the combined LPM lookup table in addition to any other labels associated with those addresses or prefixes.

When a packet is received, the source or destination address (or other shallow packet data such as port data) may be obtained from the packet and used to form a key comprising an address or prefix. Using this address or prefix a lookup can be performed in the combined LPM lookup table to obtain any labels associated with that address or prefix, including any DPI label associated with the address or prefix in the combined LPM lookup table. These returned labels may, for example, be used to populate a data object associated with the packet, where the data object includes values associated with labels based on label data returned in response to the lookup. This data object can thus indicate whether a DPI label was returned in response to the lookup (e.g., indicating a DPI based classification rule may apply to the packet), or not.

If labels returned from the lookup indicate a DPI based classification rule may apply (e.g., a DPI label was returned, or a certain value for the DPI label was returned or included in the data object associated with the packet), that packet may be provided for DPI to obtain additional DPI classification data for that packet. This additional DPI data obtained through DPI of the packet may be utilized to match any applicable DPI based classification rules at the network device and the packet forwarded accordingly. Otherwise, if the labels returned from the lookup in the combined LPM lookup table indicate that no DPI based classification rules apply to the packet (e.g., no DPI label was returned or a certain value for the DPI label was returned or included in the data object), the packet may be forwarded without performing DPI on the packet. For example, when the labels returned from the lookup in the combined LPM table indicate no DPI based classification rule applies, a determination may be made if other types of classification rules apply (e.g., OSI Layer 4 (L4) classification rules) based on the labels for the packet (e.g., as included in the data object associated with the packet) For such a determination almost any combination of the labels desired may be utilized. The packet can then be forwarded based on the results of this (e.g., L4 rule) matching.

It will be noted that while embodiments as discussed above are described with respect to a combined lookup table being adapted to return any DPI or other labels in response to a single lookup using a combined lookup table, such embodiments are provided by way of example not limitation, and other configurations of such a combined lookup table are adapted to provide DPI classification data based on shallow packet data are contemplated herein without loss of generality. For example, a combined lookup table may comprise two (or more) lookup tables where a first of those lookup tables may be adapted to provide labels (e.g., other than DPI labels) based on a lookup utilizing shallow packet data associated with a packet. The combined lookup table may also include a second lookup table associating combinations of labels (e.g., label values that may be returned from a lookup in the first lookup table) with DPI labels such that the second lookup table is adapted to return DPI labels in response to a lookup based on values for those labels.

Accordingly, when a packet is received, shallow packet data may be obtained from the packet and used to form a first key. Using this first key a first lookup can be performed in the first table to obtain labels (e.g., values for those labels) from the first lookup table. Using the labels resulting from this first lookup, a second key can be formed and used to perform a second lookup in the second lookup table to obtain any DPI label associated with the second key. The packet can then be forwarded according to the results of the first or second lookups. As can be seen then, any number of levels of indirection and tables may thus be provided in certain embodiments to provide DPI classification data based on shallow packet data, and all such embodiments are fully contemplated herein.

Embodiments as disclosed may thus provide a number of advantages. Importantly, embodiments may allow data that may be obtained solely from shallow packet inspection to be used to determine if DPI is required for a packet, and thus to avoid DPI for packets where no DPI based classification rules could apply. By confining the application of DPI to only those packets to which DPI based classification rule (e.g., L7 rules) may apply, significant amounts of processing or other overhead may be avoided. Moreover, such a determination may be made using a lookup that may additionally provide classification data regarding the application of other packet classification rules, increasing the efficiency of performing lookups for packet classification in these network devices by consolidating lookups for various aspects of packet classification and thus reducing the number of lookups performed and the overhead involved in such lookups. As such the rate of packet processing by the network device may be increased when compared to performing multiple lookups to obtain different classifications. Additionally, the quantity of resources utilized for programming a lookup table for such a lookup may be reduced when compared to the quantity of resources required to program multiple, separate lookup tables that may be used to perform separate lookups. Consequently, the efficiency of resource use may be improved, or more complicated or additional processing of packets may be enabled using the same set of resources.

Looking now at FIG. 1, a system including a network comprising one embodiment of a network device adapted to include and utilize DPI classification data in a combined lookup table is depicted. The system may include external devices (e.g., 110, 112) that utilize services provided by network 120. The services provided by network 120 may include, for example, packet forwarding or firewall services for packets transmitted by clients (e.g., 110, 112) and other devices (not shown). By forwarding packets, network 120 may enable external devices (e.g., 110, 112) or other devices to communicate with any number of devices operably connected to network 120. While described throughout with respect to packets (and packet switched networks), embodiments disclosed herein may be implemented with respect to other types of data structures used in various types of networks for data transmission. Additionally, while network 120 is illustrated as including a specific number of devices in a particular connectivity arrangement, network 120 may include different numbers or types of devices having different connectivity arrangements.

To forward packets, network 120 may include network devices 122. Network devices 122 may be physical or logical devices operably connected to any number of other devices (e.g., other network devices, external devices (e.g., 110, 112), or other devices). Network devices 122 may make packet forwarding decisions in a manner that causes packets to be routed from sending devices to destination devices. Thus, network devices 122 may be implemented to provide switching, routing, firewall services, or other types of network functionality.

Specifically, network devices 122 may be adapted to obtain packet data from received packets (e.g., and the network environment in which network device 122 resides) and use the obtained packet data to decide how to forward the packets. Embodiments of network devices 122 may be adapted to make packet forwarding decisions based on a large number of packet classification rules. Packet classification rules may define how packets having specific (e.g., control or other information) are to be classified. The applicability of any packet classification rules is thus determined based on the packet data, and the applicability of any of those packet classification rules may determine how a received packet is forwarded.

To enable network devices 122 to efficiently forward packets, network devices 122 may include (e.g., programmable) hardware or software that is able to quickly determine the applicability of packet classification rules, how to forward the packets based on the applicability of the packet classification rule or whether to perform any number of other actions based on the packets. Network devices 122 may program the programmable hardware using the obtained information regarding the packet classification policies or other information.

In particular, network devices 122 may utilize a lookup table (e.g., table as used herein will be understood to mean any type of data structure without loss of generality) that is adapted to provide packet classification data in accordance with multiple packet classification policies such that the packet classification data determined from a lookup in the lookup table based on packet data determined for a packet may be used to determine the applicability of those packet classification policies.

When a packet is received by one of network devices 122, the network device 122 may perform a single lookup in the lookup table (e.g. using the programmable hardware or software) that returns classification data for different packet classification rules. The classification data may be utilized to perform rule lookups to identify actions to be performed based on the received packet. The network device 122 that received the packet may perform the identified actions.

As discussed, it may be desirable to implement DPI based packet classification rules in association with network device 122. Such DPI based classification rules may be L7 based security rules or the like, and may be utilized extensively when network device 122 functions as a firewall or the like. However, it is less than desirable to perform DPI on packets to which none of those DPI based classification rules may even apply. It would thus be useful to differentiate packets requiring DPI (e.g., for DPI based rules classification) from other packets received at network device 122 such that DPI of those other packets may be avoided. In particular, it would be desirable to have a mechanism to determine which packets actually require DPI (e.g., by determining if any DPI packet classification rules apply to the packet), and process packets according to that determination.

Accordingly, embodiments of network device 122 may be adapted to use a lookup table including classification data for multiple packet classification rules comprising at least one DPI based classification rule that utilizes lookups based on shallow packet inspection data (e.g., a key formed from shallow packet inspection data) such that a combined lookup using shallow packet inspection data may be utilized to determine classification data for classification rules associated with shallow inspection data while also obtaining (DPI) classification data associated with DPI based classification rules from that same lookup.

This DPI classification data may indicate whether any DPI based classification rules may apply to the packet. Accordingly, when a lookup is performed in this combined lookup table in association with classification of a received packet using shallow packet data such as the source address or destination address of that packet (or other shallow packet data such as source or destination port, etc.), this DPI classification data (e.g., indicating whether any DPI based classification rule may apply to the packet) can be obtained from that lookup (e.g., in addition to any other classification data returned from the lookup).

If DPI classification data is returned for the packet indicating a DPI based classification rule (e.g., an L7 rule) may apply to the packet, the packet can be provided to a deep packet inspector adapted to perform DPI on the packet to determine additional DPI classification data for the packet.

The classification data for the packet (e.g., including any additional DPI classification data for the packet) can then be used to determine any (e.g., DPI) classification rules applicable to the packet, such as any applicable L7 based security rules, and the packet forwarded according to any applicable (e.g., DPI) classification rules. In this manner, if DPI classification data returned from a lookup in the combined lookup table indicates a DPI based classification rule may apply, that packet may be provided for DPI, and additional DPI classification data obtained through this DPI may be used to match any applicable DPI based classification rules at the network device. It will be noted that the classification data obtained in response to the lookup in the combined lookup table using shallow packet inspection data may also be utilized in such a packet classification rule lookup in addition to the DPI classification data. The packet can then be forwarded accordingly.

Alternatively, if the DPI classification data returned from the lookup in the combined lookup table indicates that no DPI based classification rules apply to the packet, the packet may be forwarded without performing DPI on the packet. For example, in certain embodiments, when the DPI classification data returned from the lookup indicates no DPI based classification rule applies (e.g., no DPI classification data is returned), a match may be performed on other types of classification rules (e.g., OSI Layer 4 (L4) classification rules) based on the classification data for the packet returned from the (e.g., same) combined lookup. The packet can then be forwarded based on the results of this (e.g., L4) classification rule matching.

Figure 2:
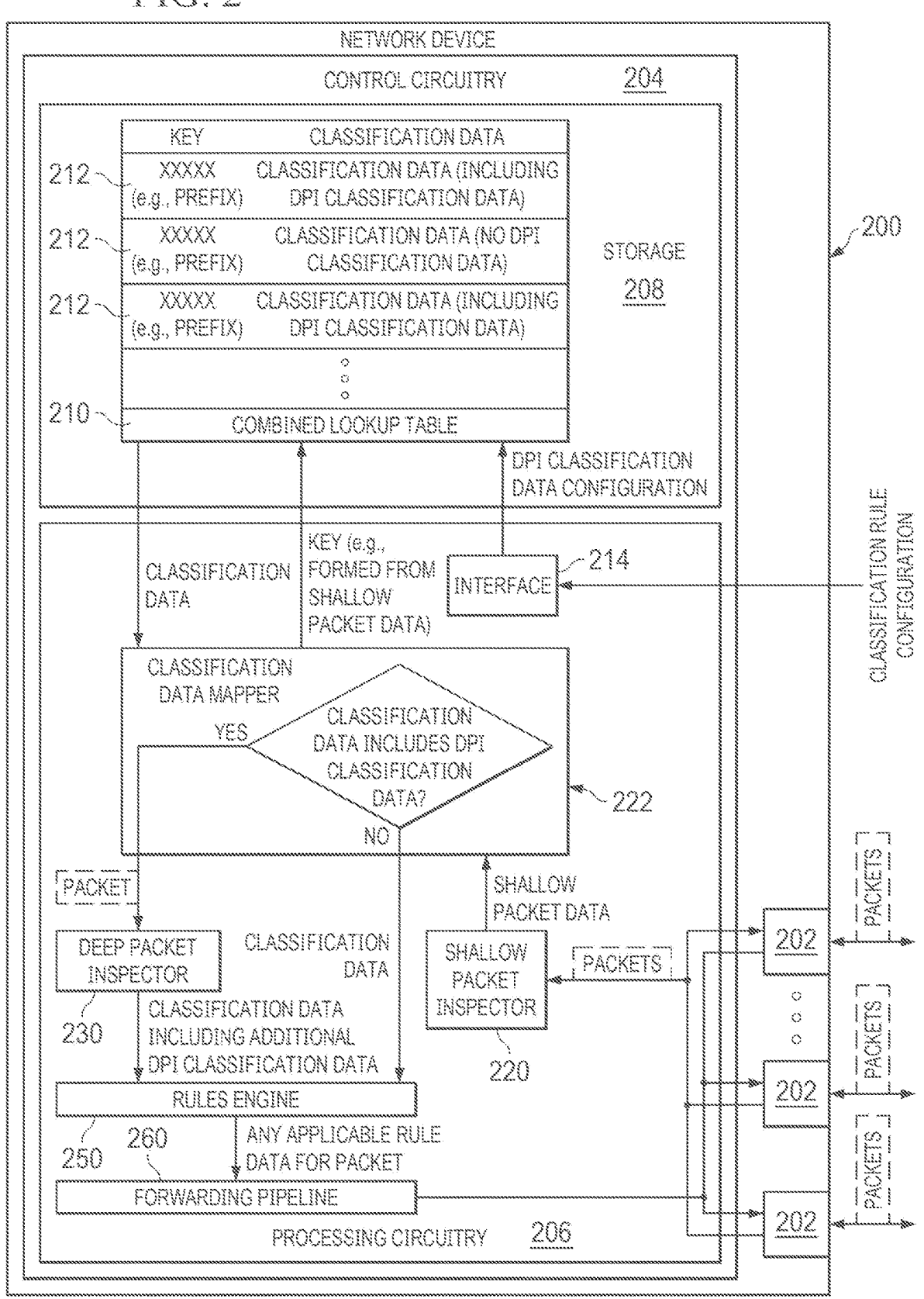
FIG. 2 is a block diagram of a network device for including and utilizing DPI classification data in a combined lookup table.

Moving then to FIG. 2, a depiction of one embodiment of a network device adapted to include and utilize DPI classification data in a combined lookup table is presented. Network device 200 may receive data, including packets, from external devices (not shown) via a network interface 202. These network interfaces 202 may be any type of network interfaces, such as an RJ45 ethernet port, a coaxial port, etc. Packet data on these packets may be provided to control circuitry 204, which includes processing circuitry 206 and storage (i.e., memory) 208. Control circuitry 204 may send and receive commands, requests, and other suitable data using an I/O path connecting control circuitry 204.

Control circuitry 204 includes processing circuitry 206 and storage 208. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry 206 is distributed across multiple separate processors or processing units, for example, multiple of the same type of processing units or multiple different processors. The circuitry described herein may execute instructions included in software running on one or more general purpose or specialized processors.

Storage 208 may be an electronic storage device that includes almost any type of storage device or combination of storage devices, including volatile random-access memory (RAM), which does not retain its contents when power is turned off or non-volatile RAM, which does retain its contents when power is turned off. As referred to herein, the phrase "electronic storage device" or "storage device" should be understood to mean any device for storing electronic data, computer software, instructions, or firmware, such as RAM, content-addressable memory (CAM) (including a Ternary CAM (TCAM)), hard drives, optical drives, solid state devices, quantum storage devices, or any other suitable fixed or removable storage devices, or any combination of the same.

According to embodiments, a combined lookup table 210 may be stored in storage 208. Such a combined lookup table 210 may be implemented in hardware (e.g. a TCAM implemented in an ASIC), software, or some combination of hardware or software). The combined lookup table may be a lookup table including classification data for multiple packet classification rules comprising at least one DPI based classification rule. Specifically, lookup table 210 may include a number of entries 212, where each entry includes a key associated with particular values for packet data that may be obtained from shallow packet inspection, such as a source or destination address (e.g., prefix), source or destination port identifier, or other classification matching parameters or qualifiers of the packet being processed that may be obtained from shallow packet inspection. For example, the keys for entries 212 in the combined lookup table may comprise a prefix, or prefix range, of network addresses. Each of the entries 212 may include corresponding classification data associated with that key. If a DPI classification rule has been associated with the values of the key for that entry (e.g., a DPI classification rule should be evaluated against packets having the packet data matching the key for that entry 212) the classification data may include DPI classification data indicating that a DPI classification rule may apply.

In particular, network device 200 may include an interface 214 (e.g., a command line interface or the like) which may allow a user to define classification rule configurations. In some embodiments, then a user may utilize interface 214 to specify DPI classification data in association with one or more values of packet data that can be obtained from shallow packet inspection and that are utilized as keys in combined lookup table 210. For example, a user may specify DPI packet classification data in association with one or more prefixes, prefix ranges, or addresses. This DPI classification data may be added to the classification data in combined lookup table 210 in association with an entry 212 having a key associated with the prefix, prefix range, or address specified by the user using interface 214.

For example, to reduce the overhead and increase the speed of packet classification combined lookup table 210 may be used to assign labels (e.g., that may be used to determine if classification rules apply to the packet) to a packet based on packet data that may be obtained from shallow packet inspection such as a source or destination address, or a port identifier, or other classification matching parameters or qualifiers of the packet being processed. These labels can then be used in determining whether those classification rules apply to the packet by associating a combination of values for those labels with particular packet classification rules and actions to be performed with respect to the packet. Thus, combined lookup table 210 may be a lookup table including one or more prefixes (e.g., address or prefixes) that operates according to a LPM method of operation. In one specific instance, for example, the lookup table may be a LPM trie where nodes of the trie comprise an address or prefix, such as a Data Plane Development Kit (DPDK) trie.

Accordingly, in certain embodiments combined lookup table 210 may be implemented as a combined LPM lookup table adapted to return labels in response to a lookup based on an address or prefix. In these embodiments, interface 214 of network device may be adapted to allow a user to associate addresses or prefixes with DPI classification data comprising a DPI label (e.g., an L7 label) indicating that the address or prefix (or a less specific prefix) is associated with a DPI based classification rule (e.g., an L7 based security policy rule). In other words, a DPI label can indicate that a DPI based classification rule or policy may (or may not) apply to that packet or that DPI should otherwise be performed on the packet. The DPI label can, for example, be a policy type label indicating a type of policy that may (or may not) apply, such as a policy label indicating that an L7 policy (e.g., one or more rules) may apply or that an L4 policy may apply. This DPI label can then be associated with the specified addresses or prefixes (or less or more specific prefixes) in the combined (e.g., LPM) lookup table 210 in addition to any other classification data (e.g., labels) associated with those addresses or prefixes. In specific embodiments, therefore, the LPM lookup table may map non-overlapping prefix sets to corresponding labels.

Control circuitry 204 of network device 200 is adapted to utilize combined lookup table 210 to determine (e.g., any) classification data (e.g., labels) associated with received packets and, based on that classification data, determine if DPI should be performed on a received packet (e.g., to determine additional DPI classification data). In embodiments, therefore, when a packet is received at a network interface 202 of network device 200, the packet may be provided to shallow packet inspector 220 to determine shallow packet data from the packet such as a source or destination address, source or destination port or other shallow packet inspection data. This shallow packet data for the packet can be provided to classification data mapper 222.

Classification data mapper 222 may utilize the shallow packet data obtained from the packet to form a key. Such a key may, for example, comprise an address or prefix. Using this address or prefix a lookup can be performed in the combined lookup table 210 to obtain classification data associated with the packet. This classification data may comprise any labels associated with that address or prefix, including any DPI label (e.g., L7 policy label) associated with the address or prefix in an entry 212 in combined LPM lookup table 210. These returned labels may, for example, be used to populate a data object associated with the packet, where the data object includes values associated with labels based on label data returned in response to the lookup. This data object can thus indicate whether a DPI label was returned in response to the lookup (e.g., indicating a DPI based classification rule may apply to the packet), or not.

If the classification data (e.g., labels) returned from the lookup indicate a DPI based classification rule may apply (e.g., a DPI label was returned, or a certain value for the DPI label was returned or included in the data object associated with the packet), classification data mapper 222 may provide the packet to deep packet inspector 230 for DPI. Deep packet inspector 230 can then perform DPI to obtain additional DPI classification data for that packet (e.g., additional labels for the packets) and that additional DPI classification data added to classification data (e.g., labels) obtained from the lookup in the combined lookup table 210.

The classification data including the additional DPI data obtained through DPI of the packet may be utilized to match any applicable DPI based classification rules at the network device and the packet forwarded accordingly. Specifically, the (values for) labels as determined from both the lookup in the combined lookup table 210 and DPI performed by deep packet inspector 230 may be utilized by rules engine 250 to determine any applicable packet classification rules. For example, the (values for) the labels may be utilized to perform a lookup in a rules table to determine any packet classification rules (e.g., L7 rules) that match the labels for the packet. The rule data resulting from that rule lookup (e.g., whether any packet classification rules match the values of the labels for that packet and the identification of such packet classification rules or actions associated with those packet classification rules), may be provided in association with the packet in forwarding pipeline 260 of network device 200 to make a forwarding decision regarding the packet, such as to drop the packet, permit the packet to be sent, offload the packet, or reject the packet.

Otherwise, if the labels returned from the lookup in the combined LPM lookup table indicate that no DPI based classification rules apply to the packet (e.g., no DPI label was returned, or a certain value for the DPI label was returned or included in the data object), the packet may be forwarded without performing DPI on the packet. For example, when the labels returned from the lookup in the combined LPM table indicate no DPI based classification rule applies, a determination may be made if other types of classification rules apply (e.g., OSI Layer 4 (L4) classification rules) based on the labels for the packet (e.g., as included in the data object associated with the packet). It will be understood that any combination of labels may be utilized in making such a determination. Specifically, the labels may be utilized to perform a lookup in a rules table to determine any packet classification rules (e.g., L4 rules) that match the labels for the packet. In such cases, the values for DPI classification data may be ignored (e.g., designated as "don't care") in a lookup. The rule data resulting from that rule lookup (e.g., whether any L4 packet classification rules match the values of the labels for that packet and the identification of such packet classification rules or actions associated with those packet classification rules), may be provided in association with that packet in forwarding pipeline 260 of network device 200 to make a forwarding decision regarding the packet, such as to drop the packet, permit the packet to be sent, offload the packet, or reject the packet.

It will be noted that while embodiments as discussed above are described with respect to a combined lookup table being adapted to return any DPI or other labels in response to a single lookup using a combined lookup table, such embodiments are provided by way of example not limitation, and other configurations of such a combined lookup table are adapted to provide DPI classification data based on shallow packet data are contemplated herein without loss of generality. For example, combined lookup table 210 may comprise two (or more) lookup tables where a first of those lookup tables may be adapted to provide labels (e.g., other than DPI labels) based on a lookup utilizing shallow packet data associated with a packet. The combined lookup table 210 may also include a second lookup table associating combinations of labels (e.g., label values that may be returned from a lookup in the first lookup table) with DPI labels such that the second lookup table is adapted to return DPI labels in response to a lookup based on values for those labels.

Accordingly, when a packet is received, shallow packet data may be obtained from the packet and used to form a first key. Using this first key a first lookup can be performed in the first table to obtain labels (e.g., values for those labels) from the first lookup table. Using the labels resulting from this first lookup, a second key can be formed and used to perform a second lookup in the second lookup table to obtain any DPI label associated with the second key. The packet can then be forwarded according to the results of the first or second lookups. As can be seen then, any number of levels of indirection and tables may thus be provided in certain embodiments to provide DPI classification data based on shallow packet data, and all such embodiments are fully contemplated herein.

Figure 3A:
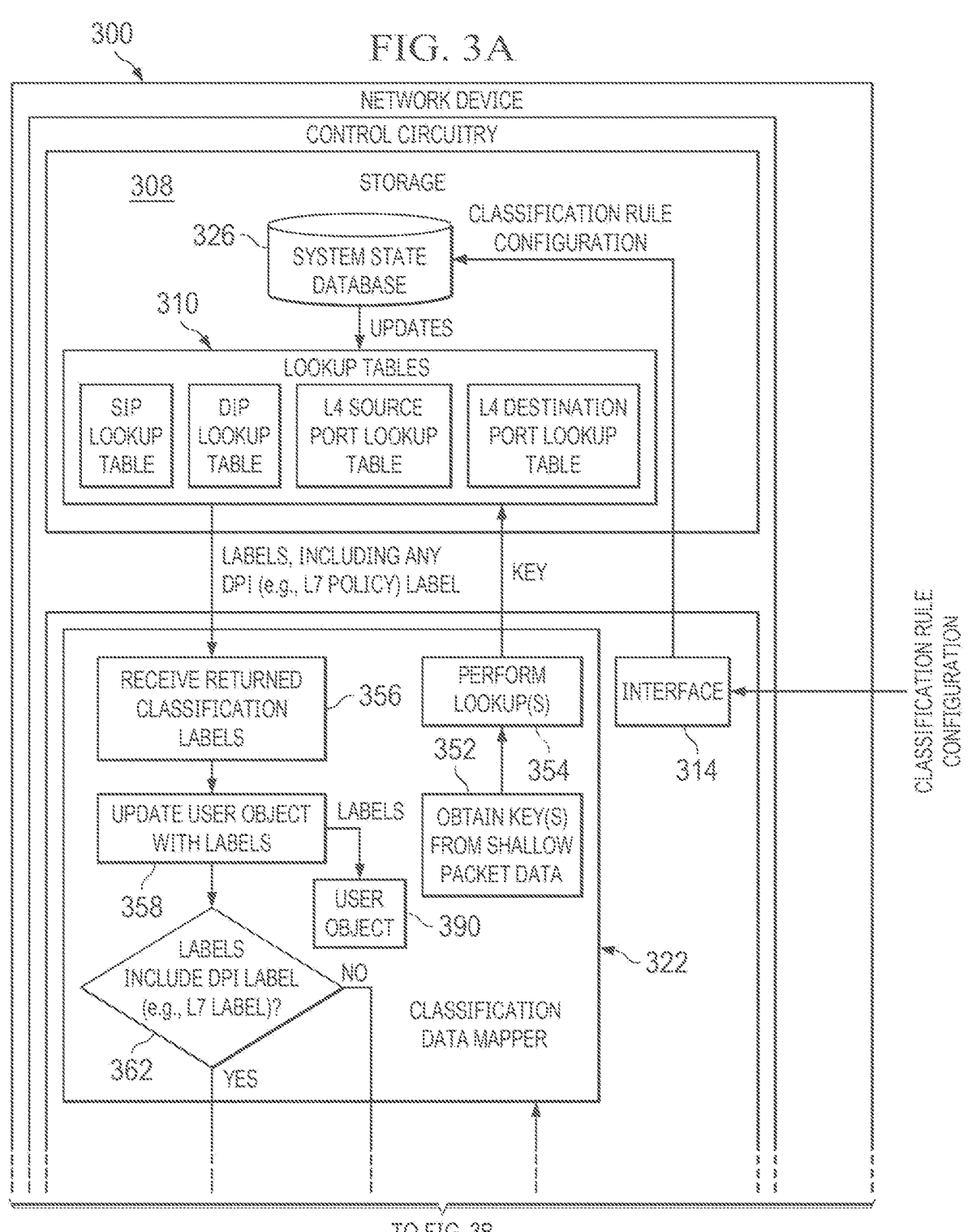
FIGS. 3A and 3B (collectively FIG. 3) are a block diagram of a network device for including and utilizing DPI classification data in a combined lookup table.
Figure 3B:
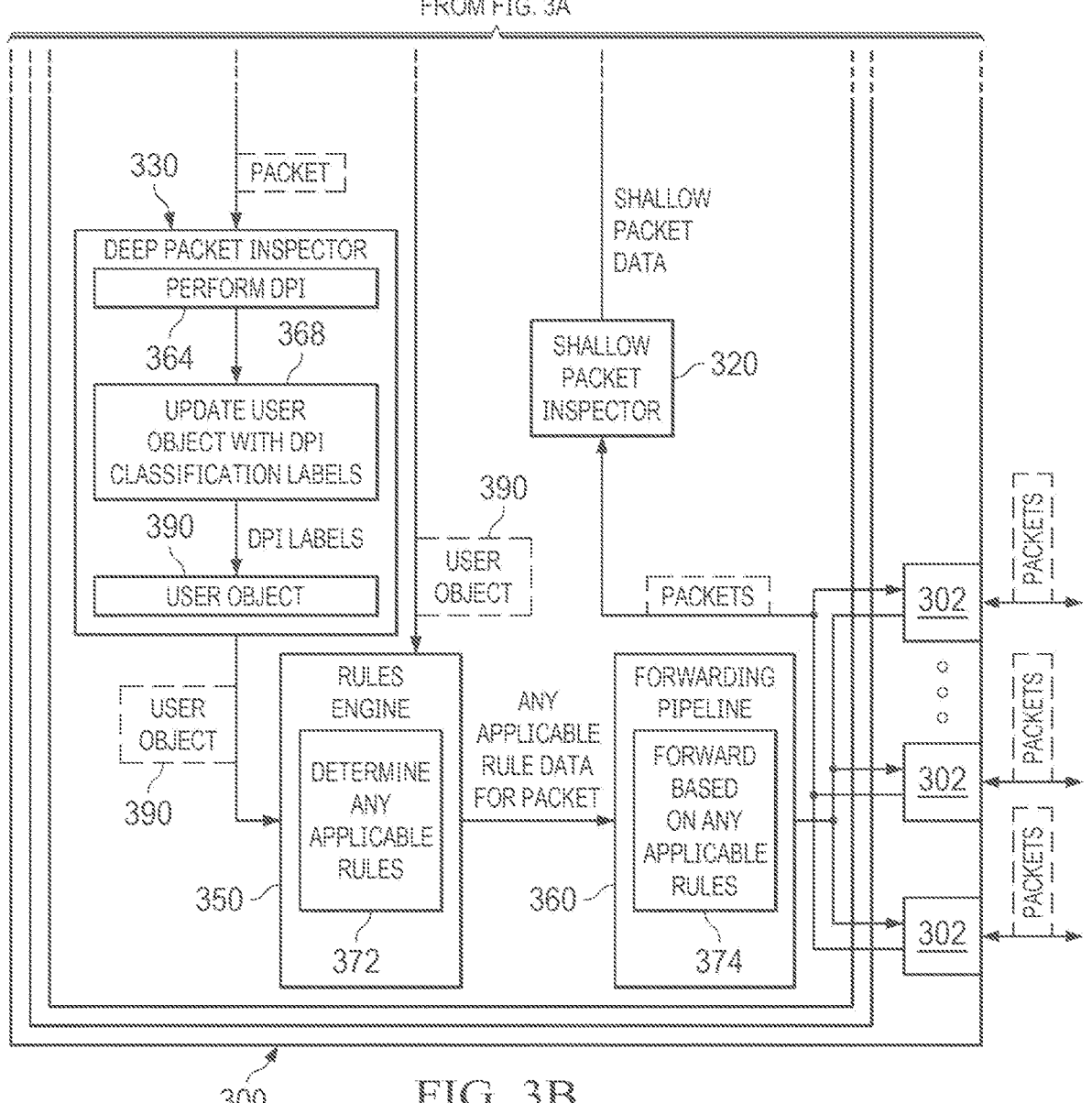

Referring to FIG. 3, a more detailed depiction of one embodiment of a network device adapted to include and utilize DPI classification data in a combined lookup table is presented. As discussed, network device 300 may receive data, including packets via network interfaces 302. One or more combined lookup table 310 may be stored in storage 308 of network device 300. The combined lookup table may be a lookup table including classification data for multiple packet classification rules comprising at least one DPI based classification rule. Specifically, lookup tables 310 may include a number of entries, where each entry includes a key associated with particular values for packet data that may be obtained from shallow packet inspection, such as a source or destination address (e.g., prefix), source or destination port identifier, or other classification matching parameters or qualifiers of the packet being processed that may be obtained from shallow packet inspection. For example, the keys for entries in the combined lookup table may comprise a prefix, or prefix range, of network addresses. Each of the entries may include corresponding classification data comprising labels associated with that key. If a DPI classification rule has been associated with the values of the key for that entry (e.g., a DPI classification rule should be evaluated against packets having the packet data matching the key for that entry) the classification data may include DPI classification data indicating that a DPI classification rule may apply.

For example, these combined lookup tables 310 may comprise entries associated with a list of increasingly specific addresses. The addresses may be specified using, for example, Classless Inter-Domain Routing (CIDR) notation by defining subsequently smaller and smaller sub-portions of all (or a subset of) potentially addressable locations. Thus, the key comprising shallow packet inspection based packet data control (e.g., source/destination internet protocol address) may be matched to these different portions of the potentially addressable locations. Each of these portions may be associated with corresponding labels or indicating one or more classification(s) based on the matching.

To illustrate in more detail, combined lookup tables 310 may be used to assign labels (e.g., that may be used to determine if classification rules apply to the packet) to a packet based on packet data that may be obtained from shallow packet inspection such as a source or destination address, or a port identifier, or other classification matching parameters or qualifiers of the packet being processed. These labels can then be used in determining whether those classification rules apply to the packet by associating a combination of values for those labels with particular packet classification rules and actions to be performed with respect to the packet. Thus, combined lookup table 310 may be a lookup table including one or more prefixes (e.g., address or prefixes) that operates according to a LPM method of operation. In one specific instance, for example, the lookup table may be a LPM trie where nodes of the trie comprise an address or prefix, such as a Data Plane Development Kit (DPDK) trie.

Such a trie data structure may include nodes that correspond to subsets specified by at least two packet classification rules. In other words, the trie may be generated to enumerate all of the subsets of at least two packet classification rules. Consequently, the resulting trie may be usable to perform a combined lookup for at least two packet classification rules. For example, if a first packet classification rule specifies a first subset as 10.1.0.0/16, and a second packet classification rule specifies a second subset of 10.0.0.0/8, and the second packet classification rule specifies a third subset of 10.1.0.0/24, then the trie may include three nodes where each node corresponds to a respective subset. The trie may organize the nodes based on a specificity of each subset associated with the nodes. In the previous example, the nodes may be organized as 10.0.0.0/8->10.1.0.0/16->10.1.0.0/24 (least to most specific). By organizing the nodes in this manner, packets may be sequentially compared to nodes (from least to most specific) to efficiently identify to which subsets packets belong.

To illustrate in more detail, packet classification rules may specify subsets (e.g., prefix, prefix range, or prefix set) of addressable network locations (e.g., internet protocol address ranges) and corresponding labels associated with each of the subsets (e.g., prefix range, or prefix set) of the addressable network locations. Packet classification rules may specify the subsets of addressable network locations using CIDR notation. DPI labels may also be specified as associated with those subsets.

For example, packet classification rules may specify a first subset as 10.1.0.0/16 (and corresponding classification of A1) and a second subset as 10.0.0.0/8 (and a corresponding classification of A2). It may also be specified that the first subset (10.1.0.0/16) is to be associated with a DPI label. When a packet is received that includes an address falling in the range 10.1.0.0/8 but not in 10.0.0.0/16, then the packet is to be classified as A2, and no DPI label is returned (e.g., indicating DPI should not be performed on this packet). When a second packet is received that includes an address falling in the range of both 10.1.0.0/8 and 10.0.0.0/16, then the packet is to be classified as A1 and A2. In this case, a DPI label may be returned (e.g., indicating DPI should be performed on the packet). While the subsets above have been explained with respect to inclusive terminology, a subset may be expressed using a combination of inclusive and exclusive terminology. For example, a subset may be expressed as 10.1.0.0/16 except 10.1.0.0/24.

In one or more embodiments disclosed herein, packet classification rules also specify subsets based on associations with Virtual Routing and Forwarding (VRF) groups. For example, packet classification rules may specify a first subset as 10.1.0.0/16 for a first VRF group (and corresponding classification of B1), a second subset as 10.0.0.0/9 for a second VRF group (and a corresponding classification of B2), and a third subset as 10.0.0.0/8 for the first VRF group (and a corresponding classification of B3). It may also be specified that the first subset for the first VRF group (10.1.0.0/16) is to be associated with a DPI label. When a packet is received that includes an address falling in the range 10.0.0.0/8 but not in 10.1.0.0/16, then the packet is to be classified as B2 and B3, and no DPI label is returned (e.g., indicating DPI should not be performed on this packet). When a second packet is received that includes an address falling in the range of both 10.0.0.0/8 and 10.1.0.0/16, then the packet is to be classified as B1, B2, and B3. In this case, a DPI label may be returned (e.g., indicating DPI should be performed on the second packet).

In some embodiments disclosed herein, packet classification rules may further specify that only a single label (e.g., other than any DPI label) is to be applied for each VRF group. For example, in a longest prefix match application, packet classification rules may further specify that each packet is only to receive a single label for each VRF group. In such a scenario, taking into account the example set forth in the previous paragraph, when the second packet is received that includes control information falling in the range of both 10.0.0.0/8 and 10.1.0.0/16, then the second packet is to only be classified as B1 (the most specific match for the first VRF group) and B2. The second packet may not be classified as B3 because it is associated with the same VRF group as the B1 classification and is less specific than the internet protocol address range associated with the B1 classification (i.e., 10.1.0.0/16 is more specific than 10.0.0.0/8). In other words, the longest prefix match for the second packet is B1 for internet protocol address ranges of 10.1.0.0/16 and 10.0.0.0/8. As in this case, the second packet is still classified as B1 the DPI label may still be returned (e.g., indicating DPI should be performed on the second packet).

According to certain embodiments therefore, combined lookup tables 310 may include any number of trie data structures. Each trie may have been generated with respect to one or more packet classification rules and each trie may include prefix sets and corresponding labels for those packet classification rules. As noted above, each trie may be arranged as a series of nodes with each node being associated with a corresponding prefix set that specifies a subset of addressable space.

Labels in such a trie may comprise labels corresponding to different packet classification rules. Accordingly, the combination of prefix sets and labels may be organized as a trie where a node of the trie specifies, at least, a tuple as, for example, <prefix, packet classification rule label A . . . packet classification rule label N>) though other arrangements are possible. Different tries may be usable to identify classification labels for similar or different packet classification rules. For example, a first trie may be usable to, via single lookup, identify a label associated with a first packet classification rule and a label associated with a second packet classification rule. A second trie may be usable to, via a single lookup, identify a label associated with the second packet classification rule and a label associated with a third packet classification rule.

In one embodiment, then, combined lookup table 310 may comprise a source IP (SIP) lookup table, a destination IP (DIP) lookup table, a L4 source port lookup table or a L4 destination port lookup table. The DIP lookup table may be an LPM table associating prefixes or prefix ranges with one or more destination labels associated with packet classification rules to be applied based on a destination IP address of a packet, the SIP lookup table may be an LPM table associating prefixes or prefix ranges with one or more source labels associated with packet classification rules to be applied based on a source IP address of a packet, the L4 source port lookup table may be a lookup table associating port identifiers with one or more labels associated with packet classification rules (e.g., L4 packet classification rules such as an Access Control List ACL) to be applied based on a source port of a packet and the L4 destination port lookup table may be a lookup table associating port identifiers with one or more labels associated with packet classification rules (e.g., L4 packet classification rules such as ACLs) to be applied based on a destination port of a packet.

To configure one or more combined lookup tables 310 to include a DPI classification label (e.g., an L7 label), network device 300 may include interface 314 which may allow a user to assign a DPI label to a prefix or prefix range. In particular, the specification of the DPI label in association with the prefix, prefix range, or IP address through interface 314 may be stored in system database 326 in association with packet classification rules. Lookup tables 310 can then be updated based on the packet classification rules and associated labels (e.g., including the DPI classification label) as stored in system database 326.

In some embodiments, then, a user may utilize interface 314 to specify that a DPI label is to be associated with one or more of a source or destination IP address, a prefix, or a prefix range. In these embodiments, interface 314 of network device may be adapted to allow a user to associate addresses or prefixes with DPI classification data comprising a DPI label (e.g., an L7 label) indicating that the address or prefix (or a less specific prefix) is associated with a DPI based classification rule (e.g., an L7 based security policy rule).

This DPI classification data (e.g., the DPI label) may be added to the labels associated with the user specified prefix, prefix range or IP address in combined lookup table 310 in association with an entry having a key comprising an associated prefix, prefix range, or address. In one embodiment, for example, a DPI label (e.g., L7 label) may be associated with the user specified prefix, prefix range, or IP address in an SIP lookup table or DIP lookup table of combined lookup table 310. The appendix below illustrates one example of the specification of an DPI classification label (e.g., L7 label) in association with a prefix. A DPI label can indicate that a DPI based classification rule or policy may (or may not) apply to that packet or that DPI should otherwise be performed on the packet. The DPI label can, for example, be a policy type label indicating a type of policy that may (or may not) apply, such as a policy label indicating that an L7 policy (e.g., one or more rules) may apply or that an L4 policy may apply. This DPI label can then be associated with the specified addresses or prefixes (or less or more specific prefixes) in the SIP lookup table or DIP lookup table in addition to any other labels associated with those addresses or prefixes.

When a packet is received at a network interface 302 of network device 300, the packet may be provided to shallow packet inspector 320 to determine shallow packet data from the packet such as a source or destination IP address, source or destination port or other shallow packet inspection data. This shallow packet data for the packet can be provided to classification data mapper 322.

Classification data mapper 322 may utilize the shallow packet data obtained from the packet to form one or more keys (STEP 352). Such a key may, for example, comprise an IP address, prefix or prefix range. Using these keys a lookup can be performed in the combined lookup table 310 to obtain labels associated with those keys, including any DPI label (e.g., L7 policy label) associated with the keys in SIP lookup table or DIP lookup table of combined lookup tables 310 (STEP 354). In this manner, an L7 label may be obtained based on a lookup utilizing a source IP address of a packet, a destination IP address of a packet or both. Lookups may also be performed using a source port or destination port in L4 source port lookup table or L4 destination port lookup table to obtain labels (e.g., associated with L4 based packet classification rules such as ACLs or the like). The received labels returned from such lookups may, for example, be used to populate a user data object 390 associated with the packet, where the user data object 390 includes values associated with labels based on label data returned in response to the one or more lookups using combined lookup table 310 (STEPS 356, 358). This user data object 390 can thus indicate whether a DPI label was returned in response to the lookup (e.g., indicating a DPI based classification rule may apply to the packet), or not.

If the labels returned from the lookup indicate a DPI based classification rule may apply (e.g., a DPI label was returned, or a certain value for the DPI label was returned or included in the user data object 390 associated with the packet), classification data mapper 322 may provide the packet to deep packet inspector 330 for DPI (Y Branch of STEP 362). Deep packet inspector 330 can then perform DPI to obtain additional DPI classification data for that packet (e.g., additional DPI labels for the packets) and that additional DPI classification data (DPI labels) added to the user data object 390 associated with the packet (STEPS 364, 368). The user data object including these additional DPI labels can then be provided to rules engine 350. If the labels returned from the lookup in the combined lookup tables 310 indicate that no DPI based classification rules apply to the packet (e.g., no DPI label was returned, or a certain value for the DPI label was returned or included in the data object), the packet may be forwarded without performing DPI on the packet by providing the user data object 390 to rules engine 350 without performing DPI on the packet (N Branch of STEP 362).

The labels included in the user data object 390 can be utilized by rules engine 350 to determine any applicable packet classification rule (STEP 372). Specifically, the (values for) labels as determined from both the lookup in the combined lookup table 310 and any DPI performed by deep packet inspector 330 may be utilized by rules engine 350 to determine any applicable packet classification rules. For example, when the user data object 390 include values for DPI labels, the (values for) the labels in user data object 390 may be utilized to perform a lookup in a rules table to determine any packet classification rules (e.g., L7 rules) that match the labels for the packet. The rule data resulting from that rule lookup (e.g., whether any packet classification rules match the values of the labels for that packet and the identification of such packet classification rules or actions associated with those packet classification rules), may be provided in association with the packet in forwarding pipeline 360 of network device 300 to make a forwarding decision regarding the packet, such as to drop the packet, permit the packet to be sent, offload the packet, or reject the packet (STEP 374).

Otherwise, if the labels in user data object 390 indicate that no DPI based classification rules apply to the packet (e.g., a certain value for the DPI label was returned or included in the user data object 390), (values of) labels in user data object 390 may be utilized to perform a lookup in a rules table to determine any packet classification rules (e.g., L4 rules) that match the labels for the packet. In such cases, the values for DPI labels in user data object 390 may be ignored (e.g., designated as "don't care") in a lookup. The rule data resulting from that rule lookup (e.g., whether any L4 packet classification rules match the values of the labels for that packet and the identification of such packet classification rules or actions associated with those packet classification rules), may be provided in association with that packet in forwarding pipeline 360 of network device 300 to make a forwarding decision regarding the packet, such as to drop the packet, permit the packet to be sent, offload the packet, or reject the packet (STEP 374).

Figure 4:
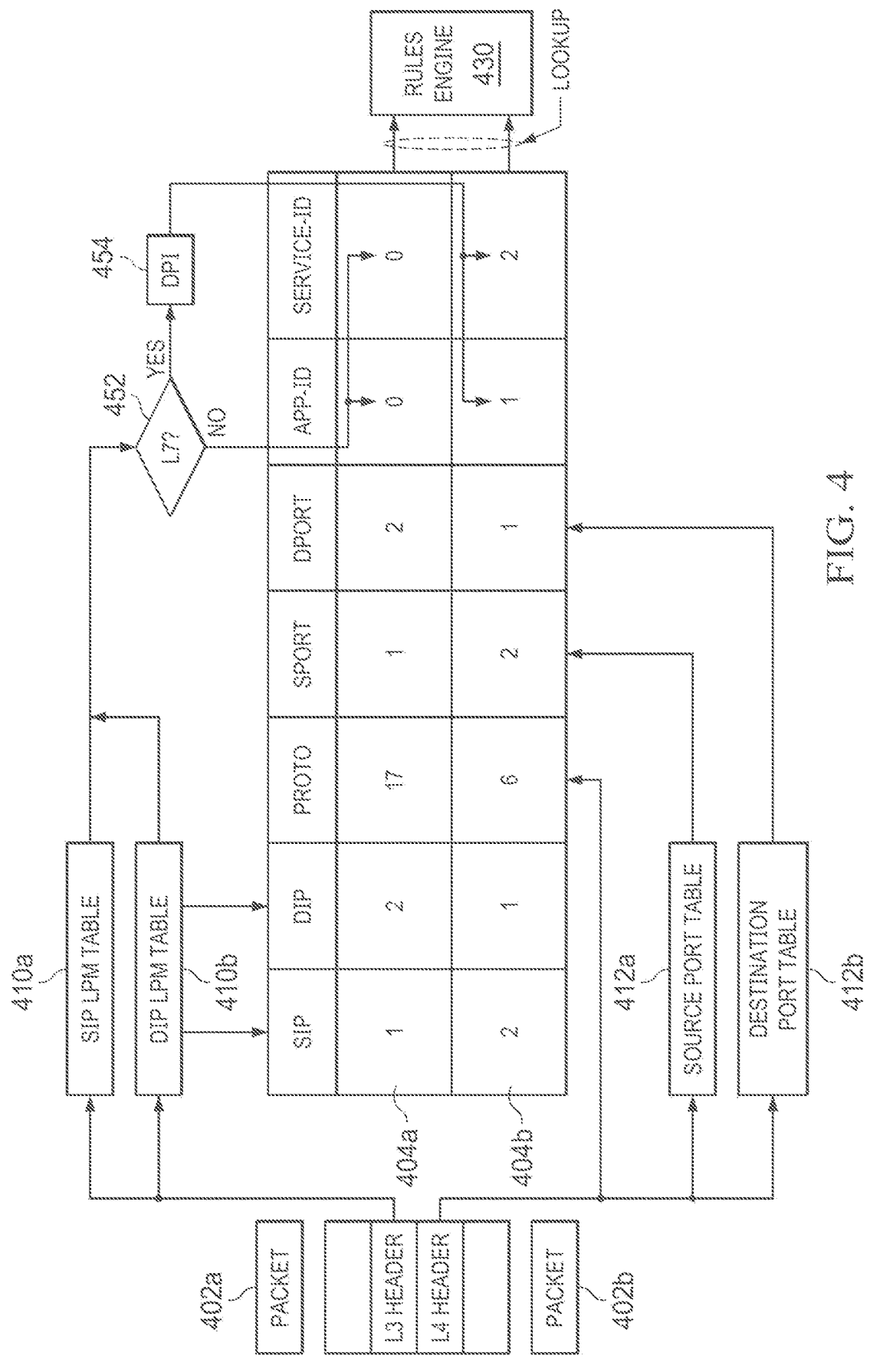
FIG. 4 is a block diagram of one example of the determination of labels for a packet using a combined lookup data table according to one embodiment.

FIG. 4 depicts one example of the determination of labels for a user data object for a packet using a combined lookup data table that is adapted to return labels in response to a lookup, including DPI labels, and the use of those DPI labels to determine whether to perform DPI on a packet. Here, combined lookup table 410 may include SIP LPM table 410*a* and DIP LPM table 410*b*, which may return labels associated with multiple packet classification rules in response to a lookup based on, respectively a source IP address (or prefix or prefix range) or destination address (or prefix or prefix range), or both obtained from a packet (e.g., using shallow packet inspection). These labels returned in response to a lookup in SIP LPM table 410a or DIP LPM table 410b may include a DPI label (an L7 label) associated with the source IP address (or prefix or prefix range) or destination address (or prefix or prefix range) address (or both) if an entry in the SIP LPM table 410a or DIP LPM table 410b corresponding to that source IP address (or prefix or prefix range) or destination address (or prefix or prefix range) is associated with an L7 label.

In this example, there are seven possible labels for which values may be stored in a user data object 404: an SIP label that may be determined from a lookup in the SIP LPM table 410a using a source IP address that can be obtained from shallow packet inspection of the L3 header of a received packet, a DIP label that can be determined from a lookup in DIP LPM table 410b using a destination IP address that can be obtained from shallow packet inspection of the L3 header of a received packet, a Proto label that can be determined from shallow packet inspection of a L4 header of a received packet, an Sport label that can be determined from a lookup in a source port table 412a using a source port that can be obtained from shallow packet inspection of a L4 header of a received packet and a Dport label that may be obtained from a lookup in a destination port table 412b using a destination port that can be obtained from shallow inspection of a L4 header of a received packet. There may be two DPI labels App-id and service-id where values for these DPI labels may be determined through use of DPI. An App-id label may be used to associate an application with a packet (e.g., a value associated with that application may be provided for an App-id label using DPI) while a service-id label may be associated with a category of service to provide for the packet (e.g., a value associated with that category of service may be provided for a service-id label using DPI).

Assume for purposes of this example, that a first packet 402a is received at a network device and user object 404a is created for that packet. A source port and a destination port may be obtained from the L4 header of packet 402a (using shallow packet inspection) and used to perform lookups in the source port table 412a and the destination port table 412b. These lookups may return labels (e.g., label values) for the Sport label and the Dport label and these labels can be used to populate user data object 404a for that packet 402a. Additionally, protocol data may be obtained from the L4 header of packet 402a and used to determine (a value for) the proto label (e.g., by performing a lookup in another table (not shown)).

Similarly, the source IP address and the destination IP address may be obtained from the L3 header of packet 402a (using shallow packet inspection) and used to perform lookups in SIP LPM table 410a and the DIP LPM table 410b. These lookups may return labels (e.g., label values) for the SIP label and the DIP label and these labels can be used to populate user data object 404a for that packet 402a. In response to the same lookup in the SIP LPM table 410a or the DIP LPM table 410b, an L7 policy type label may (or may not be) returned. Again, this L7 policy type label may, in embodiments, simply be a flag or other type of indication DPI that should (or should not) be performed for a packet.

Assume for purposes of this example that neither the lookup in SIP LPM table 410a nor the DIP LPM table 410b using the source IP address and the destination IP address obtained from the L3 header of packet 402a results in an L7 policy type label being returned (N Branch of STEP 452). In this case, the App-id (and the service-id) labels may be left blank or assigned certain values (e.g., a 0 value) in user object 404a for packet 402a when no L7 policy type label is returned from the lookup in combined lookup table 410. Accordingly, the labels (e.g., values for the labels) in user data object 404a may be utilized to perform a lookup in a rules table by rules engine 430 to determine any packet classification rules (e.g., L4 rules) that match the labels determined for packet 402a without performing DPI 454 on the packet 402a. When performing such a lookup in a rules table, the values for App-id and service-id in user data object 404a may be ignored (e.g., designated as "don't care") by rules engine 430. The rule data resulting from that rule lookup (e.g., whether any L4 packet classification rules match the values of the labels for that packet and the identification of such packet classification rules or actions associated with those packet classification rules), may be provided in association with that packet to make a forwarding decision regarding packet 402a such as to drop the packet, permit the packet to be sent, offload the packet, or reject the packet.

Further suppose that a second packet 402b is received at a network device and user object 404b is created for that packet. A source port and a destination port may be obtained from the L4 header of packet 402b (using shallow packet inspection) and used to perform lookups in the source port table 412a and the destination port table 412b. These lookups may return labels (e.g., label values) for the Sport label and the Dport label and these labels can be used to populate user data object 404b for that packet 402a. Additionally, protocol data may be obtained from the L4 header of packet 402b and used to determine (a value for) the proto label (e.g., by performing a lookup in another table (not shown)).

The source IP address and the destination IP address may be obtained from the L3 header of packet 402b (using shallow packet inspection) and used to perform lookups in SIP LPM table 410a and the DIP LPM table 410b. These lookups may return labels (e.g., label values) for the SIP label and the DIP label and these labels can be used to populate user data object 404b for that packet 402b. In response to the same lookup in the SIP LPM table 410a or the DIP LPM table 410b, an L7 policy type label may (or may not be) returned.

Assume for purposes of this example that one of the lookups in SIP LPM table 410a or DIP LPM table 410b using the source IP address and the destination IP address obtained from the L3 header of packet 402b results in an L7 policy type label being returned (Y Branch of STEP 452). In this case, the packet 402b may be provided for DPI 454, resulting in determination of values for the App-id (and the service-id) labels and the inclusion of (values for) these labels in user object 404b for packet 402b when an L7 policy type label is returned from the lookup in combined lookup table 410. Accordingly, the labels (e.g., values for the labels) in user data object 404b (including the values for labels App-id and service-id obtained from DPI 454) may be utilized to perform a lookup in a rules table by rules engine 430 to determine any packet classification rules (e.g., L7 rules) that match the labels determined for packet 402b. The rule data resulting from that rule lookup (e.g., whether any L7 packet classification rules or any other rules match the values of the labels for that packet and the identification of such packet classification rules or actions associated with those packet classification rules), may be provided in association with that packet to make a forwarding decision regarding packet 402b such as to drop the packet, permit the packet to be sent, offload the packet, or reject the packet.

It will be understood that while specific embodiments have been presented herein, these embodiments are merely illustrative, and not restrictive. Rather, the description is intended to describe illustrative embodiments, features and functions in order to provide an understanding of the embodiments without limiting the disclosure to any particularly described embodiment, feature, or function, including any such embodiment, feature, or function described. While specific embodiments of, and examples for, the embodiments are described herein for illustrative purposes only, various equivalent modifications are possible within the spirit and scope of the invention, as those skilled in the relevant art will recognize and appreciate.

As indicated, these modifications may be made in light of the foregoing description of illustrated embodiments and are to be included within the spirit and scope of the disclosure. Thus, while particular embodiments are described, a latitude of modification, various changes and substitutions are intended in the foregoing disclosures, and it will be appreciated that in some instances some features of embodiments of the invention will be employed without a corresponding use of other features, and features described with respect to one embodiment may be combined with features of other embodiments without departing from the scope and spirit of the disclosure as set forth.

APPENDIX

Here, a first example is presented where there are no overlapping prefixes across packet classification rules. Assume for this first example, that field-sets (e.g., groups of prefixes) fs1, fs2 and fs3 are defined as follows using ipv4 prefixes:

```
field-set ipv4 prefix fs1
    10.1.1.0/24
    10.1.2.0/24
    172.16.1.0/24
field-set ipv4 prefix fs2
    192.168.3.0/24
    192.168.4.0/24
field-set ipv4 prefix fs3
    192.168.1.0/24
    192.168.2.0/24
```

As can be seen there is not any overlap across the prefixes defined for these field-sets fs1, fs2 and fs3.

Now further assume for purposes of this first example that these field-sets fs1, fs2 and fs3 are used in defining the following match rules (e.g., which prefixes should be used to match packet classification rules), including rule1 which should match on the prefixes of field-set fs3, rule2 which should match on the prefixes of field-set fs1, and rule3 which should match on the prefixes of field-set fs2. Moreover, rule1 is defined as having matching criteria associated with an L7 based packet classification rule (e.g., using a command comprising "17 match" and a corresponding policy or rule named "social_media").

```
match rule1 ipv4
    source prefix field-set fs3
    17 match social_media
    actions
        count
match rule2 ipv4
    source prefix field-set fs1
    protocol tcp source port field-set fs-14ports
    actions
        count
match rule3 ipv4
```

```
    source prefix field-set fs2
    protocol tcp source port field-set fs-14ports
    actions
        count
```

In this example, match rule rule1 has an L7 match criteria, so all prefixes in field set fs3 should be associated with an L7 policy label in an LPM combined lookup table for looking up labels for incoming packets based on a key formed from an address (or prefix derived from an address) of an incoming packet. The prefixes of all the defined field-sets which should be associated with an L7 policy label in addition to other labels for packet classification rules in a combined lookup table are depicted below.

For purposes of the depicted example it will be understood that these other labels for entries in the combined lookup table associated with the prefixes may be whatever values are associated with packet classification rules that may enable a lookup of those packet classification rules when returned based on a lookup. As the values for these other labels for entries in a combined lookup are not germane for this example they have been designated generically as "X", which will be understood in this context to mean any labels that are associated with the prefix for the corresponding entry in the combined lookup table and which may be different from entry to entry.

| Prefix | Label | L7 Policy Label |
|--------|-------|-----------------|
| 192.168.1.0/24 | X | YES |
| 192.168.2.0/24 | X | YES |
| 10.1.0.0/16 | X | NO |
| 10.1.1.0/24 | X | NO |
| 10.1.2.0/24 | X | NO |
| 172.16.1.0/24 | X | NO |
| 192.168.3.0/24 | X | NO |
| 192.168.4.0/24 | X | NO |

Now, a second example is presented where there are overlapping prefixes across packet classification rules. Assume for this second example, that field-sets fs1, fs2 and fs3 are defined as follows using ipv4 prefixes:

```
field-set ipv4 prefix fs1
    10.1.1.0/24
    10.1.2.0/24
    172.16.1.0/24
field-set ipv4 prefix fs2
    192.168.3.0/24
    192.168.4.0/24
field-set ipv4 prefix fs3
    192.168.1.0/24
    192.168.2.0/24
    10.1.0.0/16
```

Notice that in this example, there is an overlap of prefixes across field-sets fs1 and fs3 (e.g., 10.1.2.0/24 and 10.1.0.0/16). Now, further assume for purposes of this second example that these field-sets fs1, fs2 and fs3 are used in defining the following match rules, including rule1 which should match on the prefixes of field-set fs3, rule2 which should match on the prefixes of field-set fs1 and rule3 which should match on the prefixes of field-set fs2. Moreover, rule1 is defined as having matching criteria associated with an L7 based packet classification rule (e.g., using the command comprising "17 match" and a corresponding policy or rule named "social_media").

```
match rule1 ipv4
    source prefix field-set fs3
    17 match social_media
```

```
        actions
            count
    match rule2 ipv4
        source prefix field-set fs1
        protocol tcp source port field-set fs-14ports
        actions
            count
    match rule3 ipv4
        source prefix field-set fs2
        protocol tcp source port field-set fs-14ports
        actions
            count
```

Again, match rule rule1 has an L7 match criteria so all prefixes in field-set fs3 should be associated with an L7 policy label in an LPM combined lookup table. However, as in this example field-set fs3 has prefixes that overlap with field-set fs1, all child prefixes (e.g., of the prefixes of field-set f3) in the LPM combined lookup table must also be associated with an L7 policy label. The prefixes of all the defined field-sets which should be associated with an L7 policy label in addition to other labels for packet classification rules in a LPM combined lookup table according to this second example are thus depicted below.

| Prefix | Label | L7 Policy Label |
|---|---|---|
| 192.168.1.0/24 | X | YES |
| 192.168.2.0/24 | X | YES |
| 10.1.0.0/16 | X | YES |
| 10.1.1.0/24 | X | YES |
| 10.1.2.0/24 | X | YES |
| 172.16.1.0/24 | X | NO |
| 192.168.3.0/24 | X | NO |
| 192.168.4.0/24 | X | NO |

What is claimed is:

1. A network device, comprising:

a processor;

a memory storing a combined lookup table comprising classification data associated with classification rules associated with shallow packet classification and deep packet inspection (DPI) based classification rules; and a non-transitory computer readable medium, comprising instructions executable on the processor for:

receiving a packet at the network device;

obtaining shallow packet data associated with the packet;

forming a key from the obtained shallow packet data;

performing a lookup in the combined lookup table based on the formed key to determine classification data associated with the packet;

when the determined classification data includes DPI classification data indicating the packet is associated with DPI based classification rules: performing DPI on the packet and forwarding the packet based on the results of the DPI;

when the determined classification data does not include DPI classification data indicating the packet is associated with DPI based classification rules: forwarding the packet without performing DPI based on the determined classification data, wherein the classification data is associated with classification rules associated with shallow packet classification.

2. The network device of claim 1, wherein forwarding the packet based on the results of the DPI comprises determining if any of the DPI based classification rules apply to the packet based on the results of the DPI performed on the packet, and forwarding the packet based on any DPI based classification rules that apply to the packet.

3. The network device of claim 2, wherein the DPI based classification rules are Layer 7 (L7) based security rules.

4. The network device of claim 2, wherein forwarding the packet without performing DPI comprises determining if any of the classification rules associated with shallow packet classification apply to the packet based on the classification data and forwarding the packet based on any of the classification rules that apply to the packet.

5. The network device of claim 4, wherein the classification rules associated with shallow packet classification are Layer 4 (L4) classification rules.

6. The network device of claim 2, wherein the combined lookup table is a longest prefix match (LPM) table comprising a set of prefixes, and the shallow packet data comprises a source address or destination address associated with the packet.

7. The network device of claim 6, wherein the LPM lookup table comprises a trie.

8. The network device of claim 6, wherein the classification data comprises a set of labels associated with the packet.

9. A method, comprising:

receiving a first packet at a network device;

obtaining first shallow packet data associated with the first packet;

forming a first key from the obtained first shallow packet data;

performing a first lookup in a combined lookup table based on the formed first key to determine first classification data associated with the first packet, wherein the combined lookup table is associated with shallow packet classification rules and deep packet inspection (DPI) based classification rules;

determining the first classification data from the first lookup in the combined lookup table includes DPI classification data indicating the first packet is associated with DPI based classification rules;

performing DPI on the first packet to determine additional DPI classification data;

determining a DPI based packet classification rule applies to the first packet based on the additional DPI classification data;

forwarding the first packet based on the DPI based packet classification rule;

receiving a second packet at the network device;

obtaining second shallow packet data associated with the second packet;

forming a second key from the obtained second shallow packet data;

performing a second lookup in the combined lookup table based on the formed second key to determine second classification data associated with second packet;

determining the second classification data from the second lookup in the combined lookup table does not include DPI classification data indicating the second packet is associated with DPI based classification rules;

determining a shallow packet data based classification rule applies to the second packet based on the second classification data from the second lookup in the combined lookup table; and forwarding the second packet based on the shallow packet data based classification rule.

10. The method of claim 9, wherein determining the DPI based packet classification rule comprises performing a lookup in a rules table based on the additional DPI classification data.

11. The method of claim 10, wherein the DPI based packet classification rule is an Layer 7 (L7) based security rule.

12. The method of claim 10, wherein determining the shallow packet data based classification rule comprises performing a lookup in the rules table based on the second classification data.

13. The method of claim 12, wherein the shallow packet data based classification rule is a Layer 4 (L4) classification rule.

14. The method of claim 9, wherein the combined lookup table is a longest prefix match (LPM) table.

15. The method of claim 14, wherein the LPM lookup table comprises a trie.

16. A non-transitory computer readable medium, comprising instructions for:

maintaining a combined lookup table associated with a plurality of packet classification rules including packet classification rules associated with shallow packet classification and deep packet inspection (DPI) based classification rules, each entry in the combined lookup table comprising a prefix and an associated set of labels;

providing an interface adapted to allow a specification of a DPI label in association with a first prefix;

associating the DPI label with a first entry in the combined lookup table including the first prefix by adding the DPI label to a first set of labels associated with the first entry;

receiving a packet;

obtaining an IP address associated with the packet;

performing a first lookup in the combined lookup table based on the obtained IP address to determine the first set of labels associated with the first entry;

determining the first set of labels includes the DPI label; and providing the packet to a deep packet inspector to perform DPI on the packet.

17. The non-transitory computer readable medium of claim 16, wherein the instructions further comprise instructions for:

determining a DPI based packet classification rule applies to the first packet based on the DPI performed on the packet, wherein the packet is forwarded based on the DPI based packet classification rule.

18. The non-transitory computer readable medium of claim 16, wherein the combined lookup table is a longest prefix match (LPM) table.

19. The non-transitory computer readable medium of claim 18, wherein the combined lookup table comprises a source IP LPM table and destination IP LPM table.

20. The non-transitory computer readable medium of claim 19, wherein the source IP LPM table and the destination IP LPM table are tries.

* * * * *